United States Patent
Xian et al.

(10) Patent No.: US 8,286,087 B1
(45) Date of Patent: Oct. 9, 2012

(54) ACTIVE ROUTE VALIDATION IN WORKFLOW PROCESS AUTHORING

(75) Inventors: Jingqi Xian, San Jose, CA (US); Betty Y. Koon, Sunnyvale, CA (US)

(73) Assignee: Adobe Systems Incorporated, San Jose, CA (US)

(*) Notice: Subject to any disclaimer, the term of this patent is extended or adjusted under 35 U.S.C. 154(b) by 541 days.

(21) Appl. No.: 12/544,700

(22) Filed: Aug. 20, 2009

(51) Int. Cl.
 *G06F 3/048* (2006.01)
 *G06F 9/44* (2006.01)
(52) U.S. Cl. ........ 715/763; 715/765; 715/967; 717/105; 717/132
(58) Field of Classification Search ............... 715/763, 715/764, 765, 835, 967, 105, 131, 132; 717/100, 717/105, 131, 132
See application file for complete search history.

(56) References Cited

U.S. PATENT DOCUMENTS

| | | | |
|---|---|---|---|
| 2003/0046657 A1* | 3/2003 | White | 717/105 |
| 2007/0156545 A1* | 7/2007 | Lin | 705/28 |
| 2008/0141174 A1* | 6/2008 | Kodosky et al. | 715/835 |
| 2008/0288621 A1* | 11/2008 | Snell et al. | 709/223 |
| 2009/0198505 A1* | 8/2009 | Gipps et al. | 705/1 |
| 2010/0134501 A1* | 6/2010 | Lowe et al. | 345/474 |

* cited by examiner

*Primary Examiner* — Xiomar L Bautista
(74) *Attorney, Agent, or Firm* — Schwegman Lundberg Woessner, P.C.

(57) ABSTRACT

Various embodiments include at least one of systems, methods, software, and data structures for active route validation in workflow process authoring in workflow processing applications. Some embodiments include evaluating a route as a user attempts to add or modify the route in a modeled workflow process. The evaluation is performed in some such embodiments through evaluation of a route restriction rule based on a first workflow element the route is from and a second workflow element the route is to. When the route restriction is violated, the user is prevented from adding or modifying the route.

17 Claims, 9 Drawing Sheets

ACTIVE ROUTE VALIDATION IN WORKFLOW PROCESS AUTHORING

BACKGROUND INFORMATION

Many computer applications include workflow processes having multiple workflow activities to be performed and routing between the workflow activities. To define and configure such workflows, these computer applications often include workflow authoring interfaces that provide a graphical view of a workflow model including elements representing activities and lines that represent routes to and from the elements. These graphical views are often displayed as flow charts.

Routes to and from elements of a workflow are often subject to rules, which if not adhered to, create errors in execution of the workflow. Discovery of rule violations usually does not occur until execution of the workflow in a production environment.

DETAILED DESCRIPTION

Figure 1:
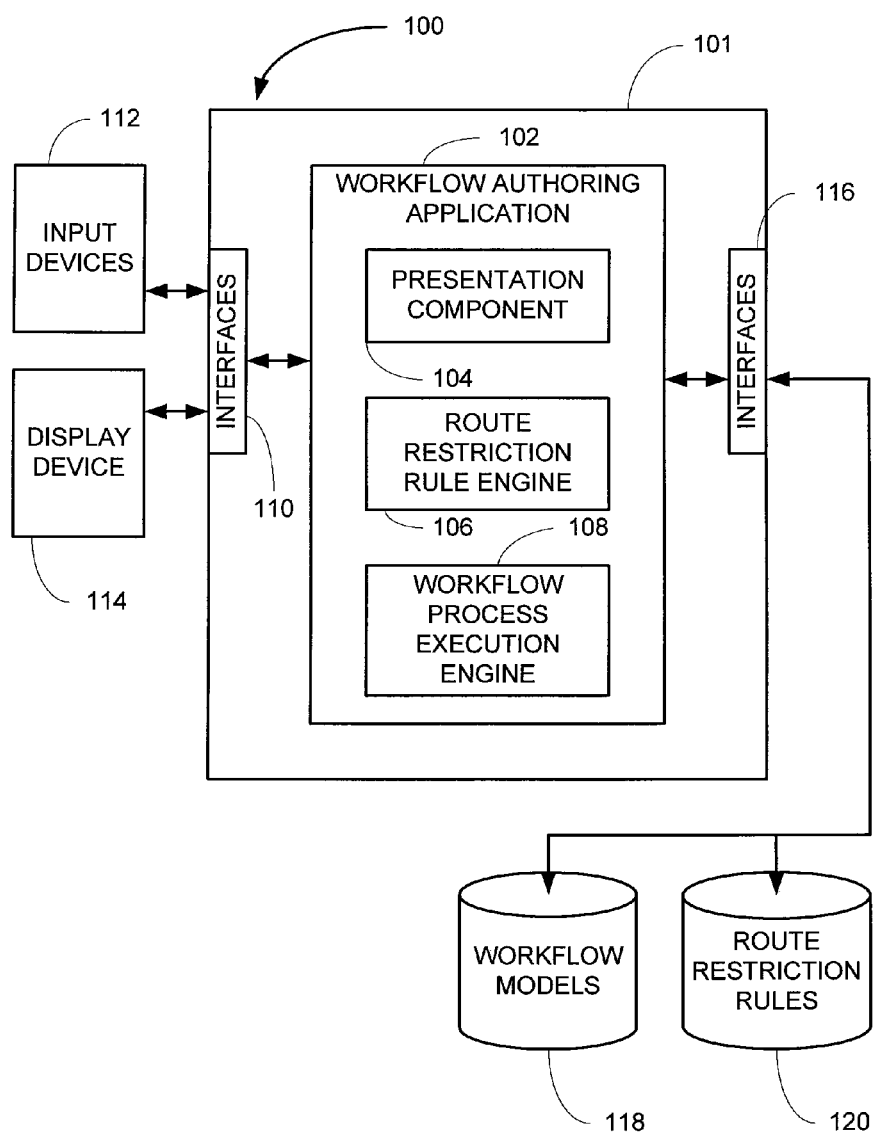
FIG. 1 is a block diagram of a system according to an example embodiment.

FIG. 1 is a block diagram of a system 100 according to an example embodiment. The system 100 is an example of a system including a computer 101 having a workflow authoring application 102 installed and operable thereon. The system 100 includes the computer 101 having at least one processor, at least one memory device, and at least one storage device. The at least one storage device stores instructions that may be loaded into the at least one memory device and executed by the at least one processor. The instructions of the system 100 include instructions defining the workflow authoring application 102.

In some embodiments, the workflow authoring application 102 includes a presentation component 104 and a route restriction rule engine 106. In some embodiments, the workflow authoring application may also include a workflow process execution engine 108 that provides an execution environment for execution of workflows models authored within the workflow authoring application 102. However, execution of the workflow models, in other embodiments, may occur in other applications on the computer 101 or on another computer.

The presentation component 104 is executable by the at least one processor to present a view of a canvas on a display device 114 of the computer 101. The display device 114 may be connected to the computer 101 via an interface of a set of multiple input/output interfaces 110 of the computer. The display device 114 is typically connected to an output interface of a graphics circuit, often referred to as a graphics card. Also connected to the multiple interfaces 110 are one or more input devices 112, such as a keyboard and a pointing device. The pointing device typically includes a mouse, touch pad, a stylus that may be utilized to provide input in embodiments when the display device 114 is a touch screen, and other similar input devices.

The presentation component 104 as it is executed provides a canvas upon which workflows may be modeled. As a workflow is modeled, the model may be stored on the one or more data storage devices of the computer 101 or in a remote data storage location 118. The remote data storage location 118 may be a networked storage location that may be accessed via one of multiple possible interfaces 116. These multiple interfaces 116 may include a network interface device, such as a wired or wireless network card, that provides data communications services over one or more networks to the computer 101 and applications executing thereon, such as the workflow authoring application 102. The multiple interfaces 114 may also, or alternatively, include a bus interface, such as a Universal Serial Bus (USB) interface that may be connected to data storage devices or other USB peripheral devices.

Workflows may be modeled within the canvas presented by the presentation component on the display device 114. A workflow model includes workflow elements including routes from workflow elements to other workflow elements. The workflow elements, in some embodiments, are each representative of one of an activity, event, sub-process, branch, or other workflow item that a workflow author may choose to include in a workflow model. Elements may also be referred to as nodes.

An activity is typically a task that is performed by a human or a data processing resource, such as a computer or hardware or software component thereof. An event is an occurrence of an activity, such as receipt of a message, modification or creation of a stored data value, or other occurrence that is either detected in or input into a workflow process. A sub-process is typically a process that executes outside of a workflow process application, such as a stored procedure that executes within a database management system, a web service called or data received by a workflow process application, a manual process performed by an external entity or other department of an organization, and the like.

A branch is an entry point or exit point to or from parallel or conditional portions of a workflow process. In some embodiments, a branch includes a branch open point and a branch close point. A branch open element may include underlying conditional logic that evaluates data to determine which branch of multiple workflow branches to follow in a workflow process. Alternatively, a branch open element may provide a route into each of multiple workflow branches that are performed in parallel. A branch close element closes processing of the branching, such as by waiting for all branches that are executed or performed in parallel to complete before continuing to a route out of the branch element. When the branching is conditional, the branch close, when reached, may simply continue to a route out of the branch element. In further embodiments, a branch open element may include conditional logic that evaluates data to identify two or more of multiple possible branches that will be executed or performed in parallel. In such embodiments, the branch close element waits for each of the two or more identified branches to complete before continuing in the workflow process.

As a workflow is modeled within the canvas provided by the presentation component 104, routes may be added. However, before a route is added to a workflow model, the route is evaluated by the route restriction rule engine 106 in view of one or more route restriction rules that may be stored locally, on a remote storage device 120, or included within the code of the route restriction rule engine 106. The route restriction rule engine 106 is called by the presentation component 104 or other process as a user attempts to add a route to a workflow model. The route restriction rule engine 106 receives as input or obtains input when called or otherwise initiated. The input is a source element of the route and a target of the route.

The input of the source and target elements may be receive in a number of ways, depending on the particular embodiment. For example, drag-and-drop click input into a pointing device of the input devices 812 selecting the source element, movement from the source element to the target element, and release input upon the target element may be received. In another embodiment, a user interface element maybe provided by the presentation component 104 or the route restriction rule engine 106 that provides user interface controls, such as drop-down list boxes and control button, to allow selection of both a source element and a target element and to receive input to create a route there between. Regardless of how the input to create a route is received, upon receipt of input indicating a such a route may be desired or upon input to create the route, the route restriction rule engine 106 applies the one or more route restriction rules to determine if the route is valid. If the route is valid, the route restriction rule engine 106 returns a valid route indicator. Otherwise, if the route is not valid, the route restriction rule engine 106 returns an invalid route indicator. In various embodiments, the valid and invalid route indicators may be a Boolean value or other data value that indicates the validity of a route or proposed route.

When a valid route indicator is received by the component tasked with adding routes, such as the presentation component 104, the data of the route is passed to the presentation component 104 to draw and present the route via the display device 114. However, an invalid route indicator is returned by the route restriction rule engine 106, the route is not recognize as a valid route and any attempt to add the route is disregarded and not added to the workflow model on the canvas of the presentation component 104.

In another embodiment, the presentation component 104, upon receipt of route input, such as a pointing device button click on a first element of a workflow model presented on the display device 114 followed by a movement of a graphical element, such as a graphical pointer, over a second element, the route restriction rule engine 106 is invoked by the presentation component 104. The presentation component passes data identifying the first element as a route source and data identifying the second element as the target. In such embodiments, the route restriction rule engine 106 evaluates a route between the first and second elements. If the route is invalid, an invalid route indicator is returned to the presentation component 104. The presentation component then modifies the graphical pointer to indicate the route is not valid. Subsequently received release input to add the route will then have no effect on the modeled workflow as the route would be invalid as previously determined.

Figure 2:
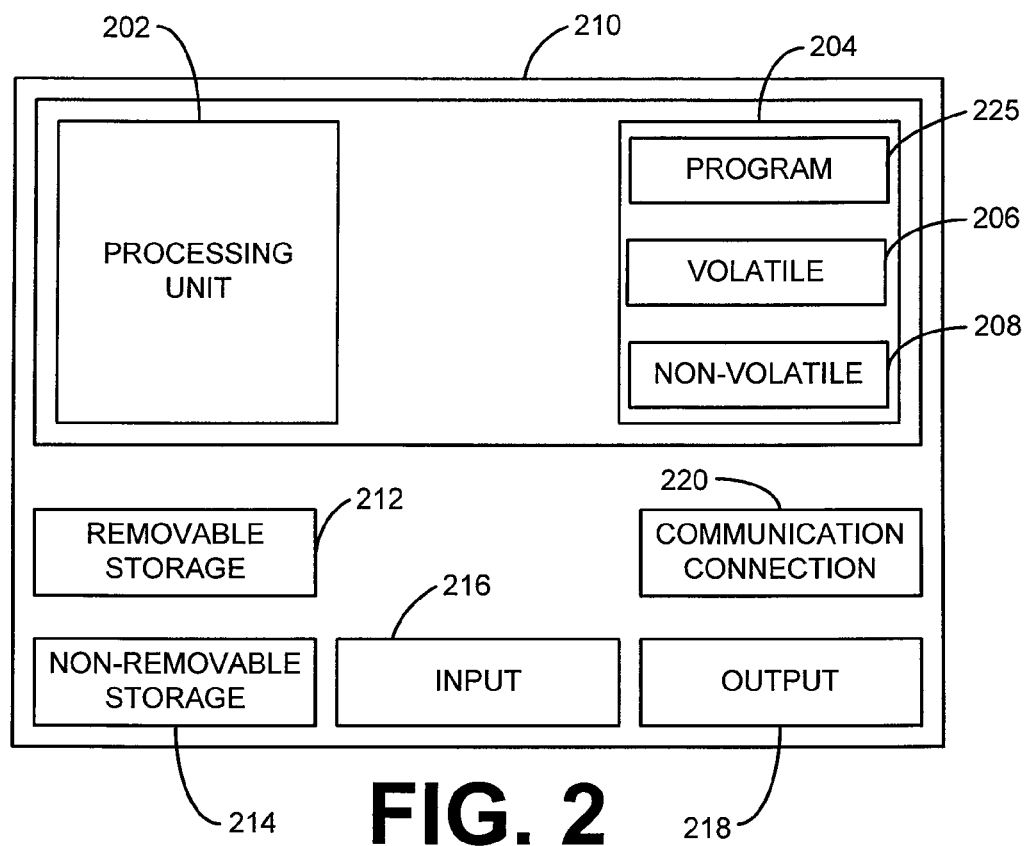
FIG. 2 is a block diagram of a computing device according to an example embodiment.

FIG. 2 is a block diagram of a computing device according to an example embodiment. The computing device of FIG. 2 is an example of a computing device that may be implemented as the computer 101 of FIG. 1. The techniques describe herein may be implemented in such a computing device, such as the methods of the various described embodiments. In one embodiment, multiple such computer systems are utilized in a distributed network to implement multiple components in a transaction-based environment. An object-oriented architecture may be used to implement such functions and communicate between the multiple systems and components. One example-computing device in the form of a computer 210, may include at least one processing unit 202, memory 204, removable storage 212, and non-removable storage 214. Memory 204 may include volatile memory 206 and non-volatile memory 208. Computer 210 may include— or have access to a computing environment that includes—a variety of computer-readable storage mediums, such as volatile memory 206 and non-volatile memory 208, removable storage 212, and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 210 may include or have access to a computing environment that includes input 216, output 218, and a communication connection 220. The computer may operate in a networked environment using a communication connection to connect to one or more remote computers, such as database servers and application servers. The remote computer may include a personal computer (PC), a desktop computer, a laptop computer, a notebook computer, netbook computer, workstation, mainframe computer system, handheld computer, application server or other server type, router, network PC, a peer device or other common network node, or the like. The computer may also include a consumer electronics device such as a camera, camcorder, set top box, mobile device, video game console, handheld video game device, an electronic book reading device, or in general any type of computing or electronic device. The communication connection may include a connection via a network interface device to one or more of a Local Area Network (LAN), a Wide Area Network (WAN), the Internet, and other networks.

Computer-readable instructions stored on a computer-readable storage medium are executable by the at least one processing unit 202 of the computer 210. A hard drive, CD-ROM, and RAM are some examples of articles including a computer-readable storage medium. For example, a computer program 225 may be stored on one or more computer-readable storage mediums. The computer program 225 may include instructions executable by the at least one processing unit 202 to perform one or more of the methods and provide the user interfaces and functionality as described herein. For example, the computer program 225 may be the workflow authoring application 102 illustrated and described with regard to FIG. 1.

Figure 3:
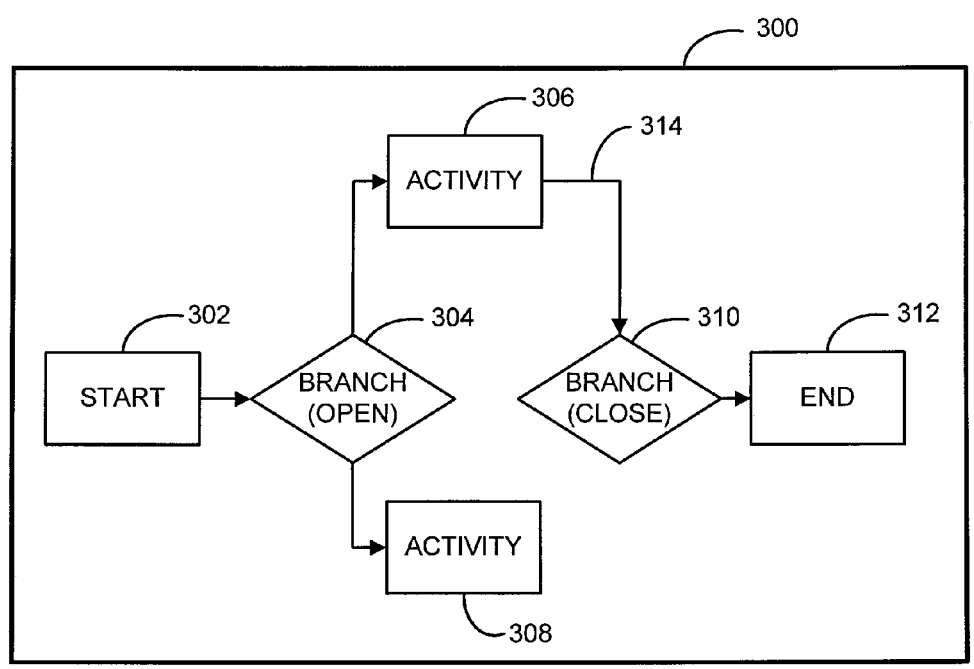
FIG. 3 is a user interface diagram, illustrating a user interface, according to an example embodiment.

FIG. 3 is a user interface diagram, illustrating a user interface, according to an example embodiment. The user interface includes a workflow process authoring and viewing canvas 300, also simply referred to as a canvas. The canvas 300 is an example of a canvas that may be presented via the display device 114 as generated by the presentation component 104 of the workflow authoring application 102 as described and illustrated with regard to FIG. 1. The canvas 300 includes elements 302, 304, 306, 308, 310, and 312. The elements are each representative of one of an activity, event, sub-process, branch, or other workflow item that a workflow author may choose to include in a workflow model.

An activity is typically a task that is performed by a human or a data processing resource, such as a computer. An event is an occurrence of an activity, such as receipt of a message, modification or creation of a stored data value, or other occurrence that is either detected in or input into a workflow process. A sub-process is typically a process that executes outside of a workflow process application, such as a stored procedure that executes within a database management system, a web service called or data received by a workflow process application, a manual process performed by an external entity or other department of an organization, and the like.

A branch is an entry point or exit point to or from parallel or conditional portions of a workflow process. In some embodiments, a branch includes a branch open point, such as branch open element 304, and a branch close point, such as branch element 310. A branch open element may include underlying conditional logic that evaluates data to determine which branch of multiple workflow branches to follow in a workflow process. Alternatively, a branch open element may provide a route into each of multiple workflow branches that are performed in parallel. A branch close element closes processing of the branching, such as by waiting for all branches that are executed or performed in parallel to complete before continuing to a route out of the branch element. When the branching is conditional, the branch close, when reached, may simply continue to a route out of the branch element. In further embodiments, a branch open element may include conditional logic that evaluates data to identify two or more of multiple possible branches that will be executed or performed in parallel. In such embodiments, the branch close element waits for each of the two or more identified branches to complete before continuing in the workflow process.

When designing processes in workflow process applications, elements are added to the canvas 300 and routes are drawn between the elements. For example, two elements may be added to a canvas, such as activity element 306 and branch close element 310. A route may then be drawn from the activity element 306 to the branch close element 310, such as route 314, signifying that when the underlying activity of activity element 306 is completed, the branch close element 310 is then called.

Drawing routes from one element to another may be performed in a drag-and-drop manner, such as by extending a graphical portion of a first element to a graphical element of the other element. A route may also be drawn by clicking the first element with a gesture input device, such as a mouse or other pointing device, dragging the mouse while holding the clicked gesture input device button down over to an element which the route is to flow, and releasing the button. Other combinations of gestures provided as input through manipulation of a gesture input device or other input devices, such as a keyboard or a touch screen, may also or alternatively be manipulated to provide input to add a route to a workflow process being authored. In further embodiments, a user interface may be provided, such as by the presentation component 104 of FIG. 1 in the form of a pop-up window, to request and receive input identifying elements a route is to be added between. Routes may also be modified and deleted.

A workflow model displayed on the canvas 300 includes an underlying data structure that holds the data visually represented on the canvas 300. The data may be stored in memory, on a data storage device such as a hard drive, in a database, or other device capable of electronically storing data. For example, a work flow model may be stored in a remote data storage location 118 as illustrated and described with regard to FIG. 1. The data structure, in some embodiments, is an eXtensible Markup Language (XML) document. Each element in such an XML document is declared and properties defined. The canvas 300 and the workflow process application of which it is a part include data processing tools, such as menu items, user interfaces, guided "wizard" processes, and the like to assist workflow authors in adding, removing, and modifying elements, routes, and the data of the underlying data structure. In some embodiments, the workflow process application includes a palate of elements that may be placed on the canvas 300 in a drag-and-drop fashion. Further, elements within the canvas may also be repositioned, routed, and re-routed in a drag-and-drop fashion.

Figure 4:
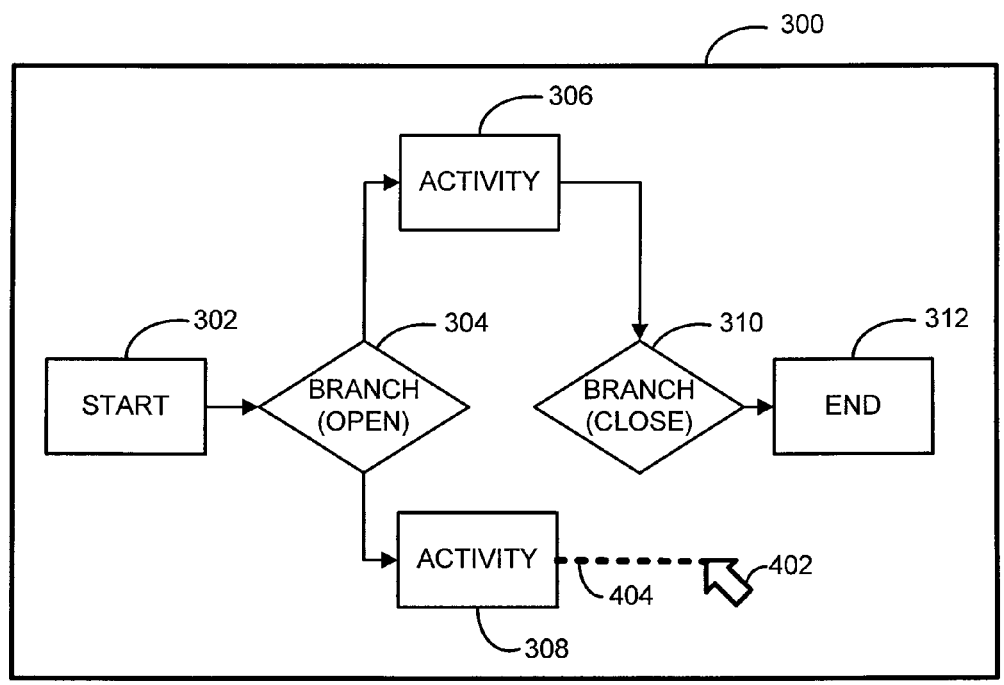
FIG. 4 is a user interface diagram, illustrating a user interface, according to an example embodiment.

FIG. 4 is a user interface diagram, illustrating a user interface, according to an example embodiment. The user interface of FIG. 4 includes the canvas 300 and the elements 302, 304, 306, 308, 310, and 312 as illustrated in FIG. 3. In this instance though, a user has started drawing a route 404 from the activity element 308. To initiate the drawing of a route, the user may click a user interface control, such as a menu item, control button, use a combination of keyboard keys and gesturing tool gestures, or other input such as through a route-adding user interface. In one example embodiment, to add the route 404, the user moves a gesturing tool icon 402 over the activity element 308. As used herein, the term "icon" in used to describe one or more graphical elements that are moved graphical within a user interface under control of a gesturing tool, such as a mouse or other pointing device. Then the user clicks a button of the gesturing tool and while holding the button down, drags the gesturing tool icon 402 from the activity element 308. As the user drags the gesturing tool icon 402 from the activity element 308, the route 404 is added to the canvas 300. The user will continue to drag the gesturing tool icon 402 to another element on the canvas 300 and release the gesturing tool button while the gesturing tool icon 402 hovers over the element to which the route is to be drawn. However, a route from one workflow element may not necessarily be connected to just any element of the workflow being authored. Routes are subject to one or more route restriction rules.

A route restriction rule may provide that a route cannot not be drawn from a leaf node of one branch to a leaf node of another branch, such as from activity element 308 to activity element 306. This is also true when a branch has a sub-branch within the branch. For example, if the branch from branch element 304 were to include another branch following activity element 308, the activity element 308 could be routed to the branch open element but not to an element immediately following that branch open element. Further, the activity element 308 cannot be routed directly back to the start element 302. The activity element 308 must first be routed to the branch close element 310 before being routed to any other element outside of the branch flowing from the branch open element 304. Simply stated, a user is allowed to connect an element within a branch to another element in the same branch. However, routing between two elements between two different branches is not allowed. These routing restrictions may be included in some embodiments. However, other embodiments may include fewer route restrictions, more route restrictions, other route restrictions, or some or all of these route restrictions along with other route restrictions. One or more route restriction rules may be stored on a computer upon which a workflow process is being modeled, in a remote data storage location such as on the remote storage device 120 of FIG. 1, or included in code of a workflow process application. In some embodiments, the route restriction rules are applied by the route restriction rule engine 106 of FIG. 1.

If one of the above route restrictions are violated in a workflow process modeled in the canvas 300, the resulting workflow process when executed within a workflow process application will cause an error, which is a technical problem. To prevent violations of these route restrictions and to solve the technical problem, the route restrictions are evaluated as attempts are made to add the routes to a workflow being modeled on the canvas 300. In some embodiments, the route restrictions are evaluated against the data held in the underlying data structure. If at least one route restriction is violated by an attempted routing, data representing the attempted routing is not added to the underlying data structure and the route is not added to the canvas 300. Thus, by evaluating the data of a route, such as in the route restriction rule engine 106 of FIG. 1, before the route is added to a workflow model according to route restriction rules and doing so in a programmatic manner, a technical solution to the technical problem is provided. As a result, workflow models including invalid routes do not reach workflow processing applications that may attempt to execute invalid routes and abnormally end (abend) execution of the workflow process. This saves processing time and saves administrator time through prevention of abends through programmatic and data process enforcement of route restriction rules.

Figure 5:
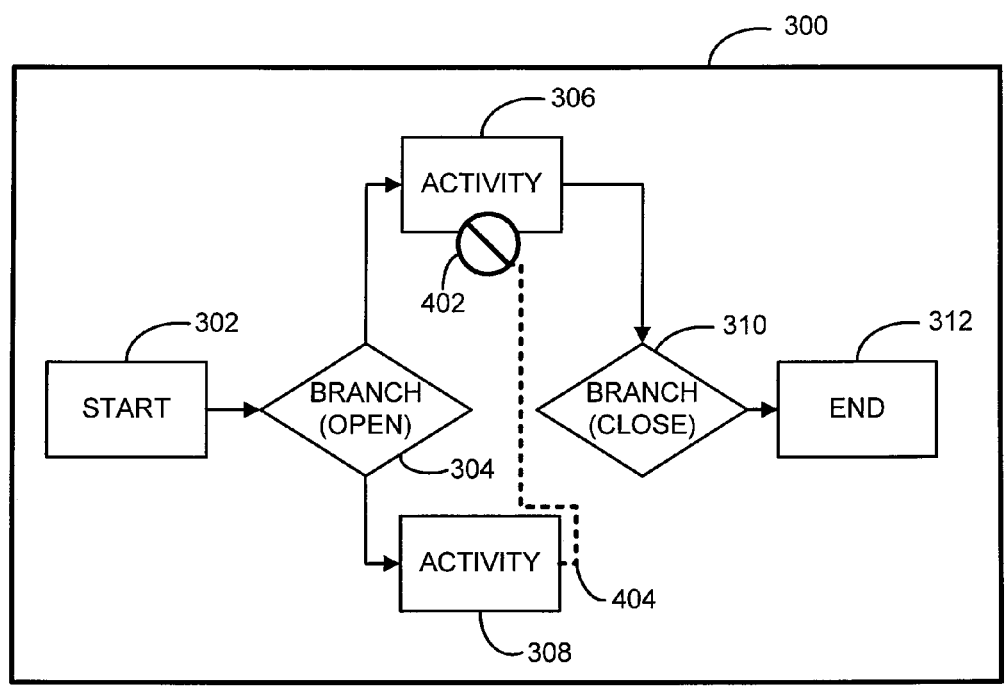
FIG. 5 is a user interface diagram, illustrating a user interface, according to an example embodiment.

FIG. 5 is a user interface diagram, illustrating a user interface, according to an example embodiment. The user interface of FIG. 5 includes the canvas 300 and the elements 302, 304, 306, 308, 310, and 312 as illustrated in FIG. 3 and FIG. 4. Also included in the user interface of FIG. 5 is the route 404 as added in FIG. 4. In the illustration of the user interface of FIG. 5 the user has dragged the gesturing tool icon 402 of FIG. 4 over the activity element 306. Upon the gesturing tool icon 402 hovering over a portion of the activity element 306, rules embodying the routing restrictions are processed by the workflow authoring application of which the canvas 300 is a part. Processing of the routing restriction rules identifies a routing restriction violation. In this instance, the violation is identified because the activity element 308 is in a different branch than the activity element 306. As a result, the gesturing tool icon 402 is modified from a pointer icon as illustrated in FIG. 4 to another gesturing tool icon 502, such as the restriction icon as illustrated in FIG. 5. In some embodiments, along with or instead of modifying the gesturing tool icon 502 to indicate the route restriction violation, the canvas 300 or one or more of the elements may be modified, such as by changing a color of an element, a background color of the canvas, or other visual modification to convey the route restriction violation. In some embodiments, in addition to, or instead of, a visual modification, an audible indication may be generated, such as by providing an audible output from a sound card or other audible signal generating device of a computer providing the user interface of FIG. 5. Should the user release the gesturing tool button while the gesturing tool icon 502 hovers over a portion of the activity element 306, the attempt to add the route 404 will be ignored, such as by not recognizing the attempt to add the route 404 as acceptable input and removing the route 404 from the canvas 300. Should the user move the gesturing tool icon away from the activity element 306, the gesturing tool icon 502 will again be modified, this time back to the pointer icon of gesturing tool icon 402 illustrated in FIG. 4. In further embodiments, the gesturing tool icon 502 indicating a restriction violation as in FIG. 5 may be displayed by default, only changing when the gesturing tool icon 502 hovers over an element that does not violation one of the route restrictions.

Through evaluation of the route restrictions as each route is added to a workflow, additional of invalid routes is prevented. This active, authoring-time route restriction enforcement prevents run-time errors and removes a need for performing a compile-like process against routes of a workflow at a time prior to execution of the modeled workflow.

Figure 6:
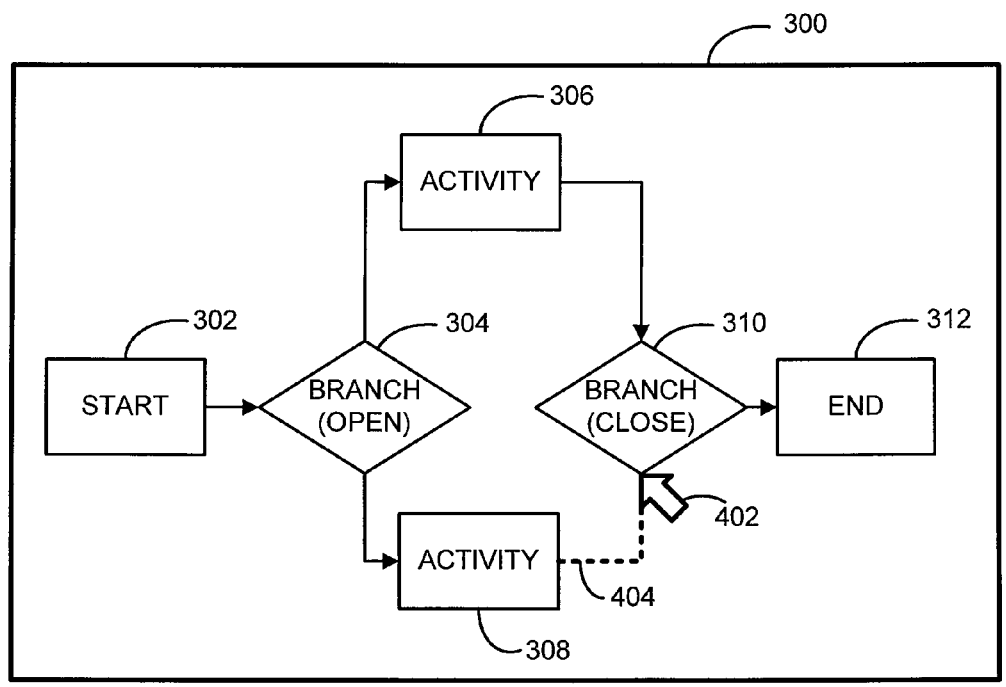
FIG. 6 is a user interface diagram, illustrating a user interface, according to an example embodiment.

FIG. 6 is a user interface diagram, illustrating a user interface, according to an example embodiment. The user interface of FIG. 6 includes the canvas 300 and the elements 302, 304, 306, 308, 310, and 312 as illustrated in FIG. 3, FIG. 4, and FIG. 5. Also included in the user interface of FIG. 6 is the route 404 as added in FIG. 4 as well as the gesturing tool icon 402. In this illustration, the user has dragged the gesturing tool icon 402 over a portion of the branch close element 310. As the gesturing tool icon 402 is dragged over the branch close element 310, the route restrictions are evaluated, such as by a route restriction rule engine 106 of FIG. 1 evaluating a route between activity element 308 and branch close element 310 according to a route restriction rule included within executable code of the route restriction rule engine 106, and a violation is not identified. Thus, the gesturing tool icon 402 remains displayed as a pointer icon. However in other embodiments as mentioned above, prior to hovering over the branch close element 310 or any other element, the gesturing tool icon 402 may instead be presented as the restriction icon as illustrated with regard to the gesturing tool icon 502 of FIG. 5. In either instance, when the user hovers the gesturing tool icon 402 over the branch close element 310, the user interface indicates that the attempted routing is allowed.

Figure 7:
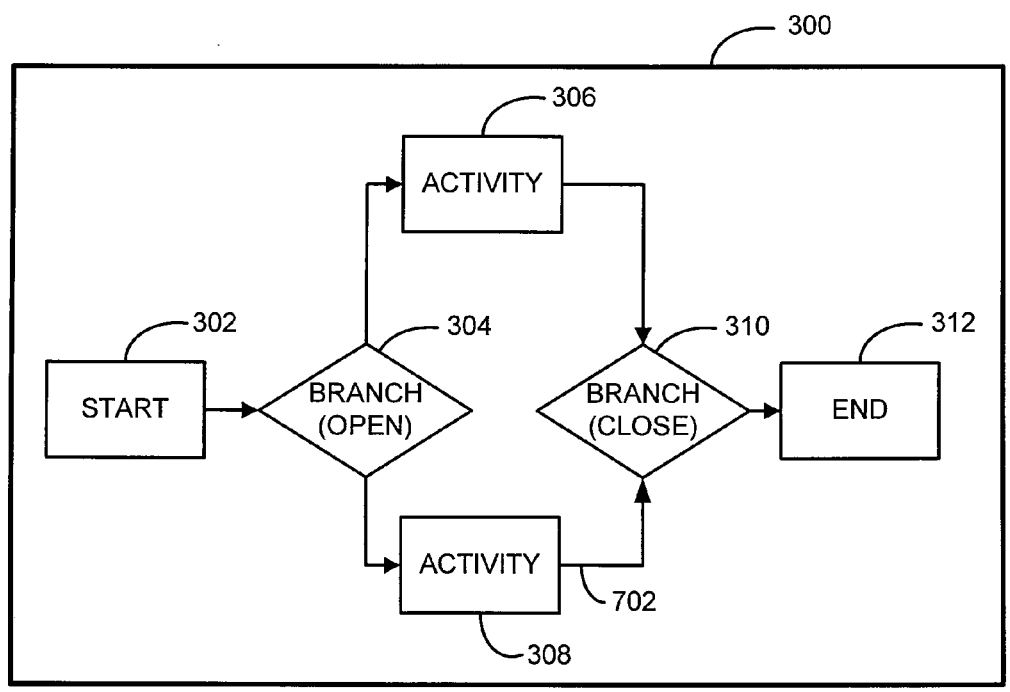
FIG. 7 is a user interface diagram, illustrating a user interface, according to an example embodiment.

FIG. 7 is a user interface diagram, illustrating a user interface, according to an example embodiment. The user interface of FIG. 7 includes the canvas 300 and the elements 302, 304, 306, 308, 310, and 312 as illustrated in FIG. 3, FIG. 4, FIG. 5, and FIG. 6. The workflow modeled on the canvas 300 includes a route 702 that is added to the workflow upon the user releasing the gesturing tool button while hovering over the branch close element 310 as initiated in the description of FIG. 6. As part of adding the route 702 to the modeled workflow, data representing the route 702 is also added to the underlying data structure of the workflow model. The adding of the route 702 is graphically presented in the canvas 300, in some embodiments, by a presentation component 104 as illustrated and described with regard to FIG. 1, which may also modify the underlying data structure of the workflow model.

The data structure that underlies a workflow model presented on the canvas 300 and as may be modified, evaluated, and stored by components of a workflow authoring application, such as the workflow authoring application 102 of FIG. 1 may take different forms depending on the particular embodiment. An example portion of such a data structure according to some embodiments may include:

<element><elementname:element_1 type:activity . . . >
       </element>
    <element><elementname:element_2 type:activity . . . >
       </element>
    <route><route_no:1 routeSource:element_1 routeTarget-element_2></route>

In this example data structure portion, there are two elements declared and a route is provided between the two elements. The ellipsis (i.e., the " . . . ") is provided in this example to represent other data defining the elements that may be included, such as data define other properties of the element.

Figure 8:
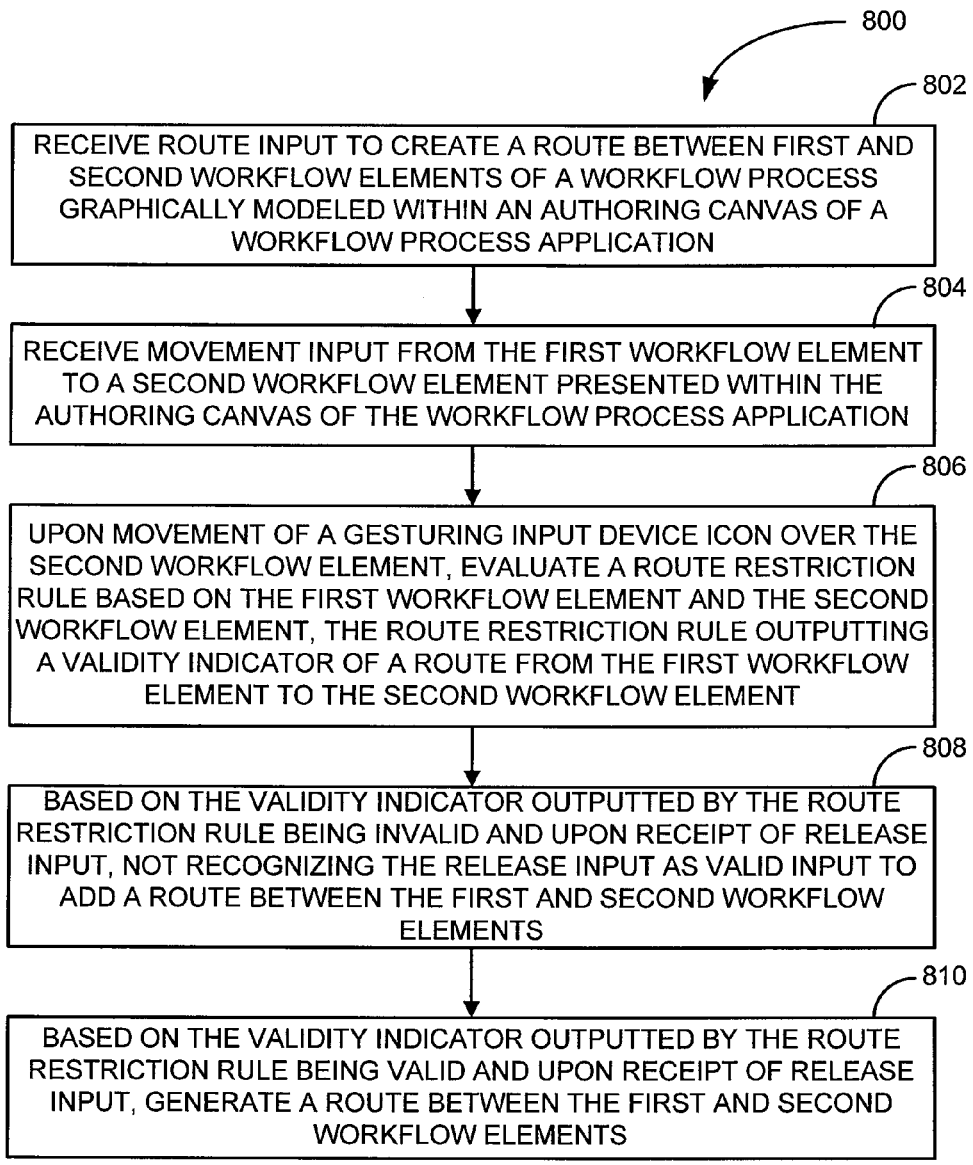
FIG. 8 is a block flow diagram of a method according to an example embodiment.

FIG. 8 is a block flow diagram of a method 800 according to an example embodiment. The method 800 is an example of a method performed by a workflow process authoring application to define a route between two elements of a modeled workflow process. The method 800 includes receiving 802 route input to create a route between first and second workflow elements of a workflow process graphically modeled within an authoring canvas of a workflow process authoring application. The route input typically includes a button press of a gesturing input device while a gesturing input device icon, such as a pointer, hovers over the first workflow element.

The method 800 further includes receiving 804, via the gesturing input device, movement input from the first workflow element to a second workflow element and upon movement of a gesturing input device icon over the second workflow element, evaluating 806 a restriction rule. Receiving 804 the movement input, in some embodiments, includes detecting a movement of a gesturing input device while a button remains pressed. The route restriction rule is evaluated 806 based on the first workflow element and the second workflow element and the restriction rule outputs a validity indicator of a route from the first workflow element to the second workflow element. When the validity indicator output by at least one route restriction rule is invalid and upon receipt of release input, the method 800 does not recognize 808 release input to add a route between the first and second workflow elements. When the validity indicator following evaluation of all of the at least one route restrictions rules is valid and upon receipt of release input, the method 800 generates 810 a route between the first and second workflow elements. Receipt of the release input, in some embodiments, includes receiving a release of a gesturing input device button that was initially depressed to receive 802 the initiation input and held down while receiving 802 the drag input.

In one embodiment of the method 800, the route restriction rule outputs an invalid route indicator when the first workflow element is within a branch of a modeled workflow process and the second workflow element is not within that branch. When the validity indictor output by the route restriction rule is invalid, some embodiments include modifying a portion of the authoring canvas to indicate a route between the first and second workflow elements cannot be made. Modifying the at least one portion of the authoring canvas in such embodiments may include modifying one or both of an appearance of the gesturing input device icon while the gesturing input device icon hovers over the second workflow element and an appearance of the second workflow element. An additional or alternative output indicating a route restriction rule is violated may include an audible output, such as a beep or other sound from a sound signal generating device of a computer performing the method 800, such as a sound card.

In the method 800, generating 810 a route between the first and second workflow elements typically includes adding data representative of the added route to a data structure of the workflow process graphically modeled within the authoring canvas and storing the data structure in a memory device of the computer.

Figure 9:
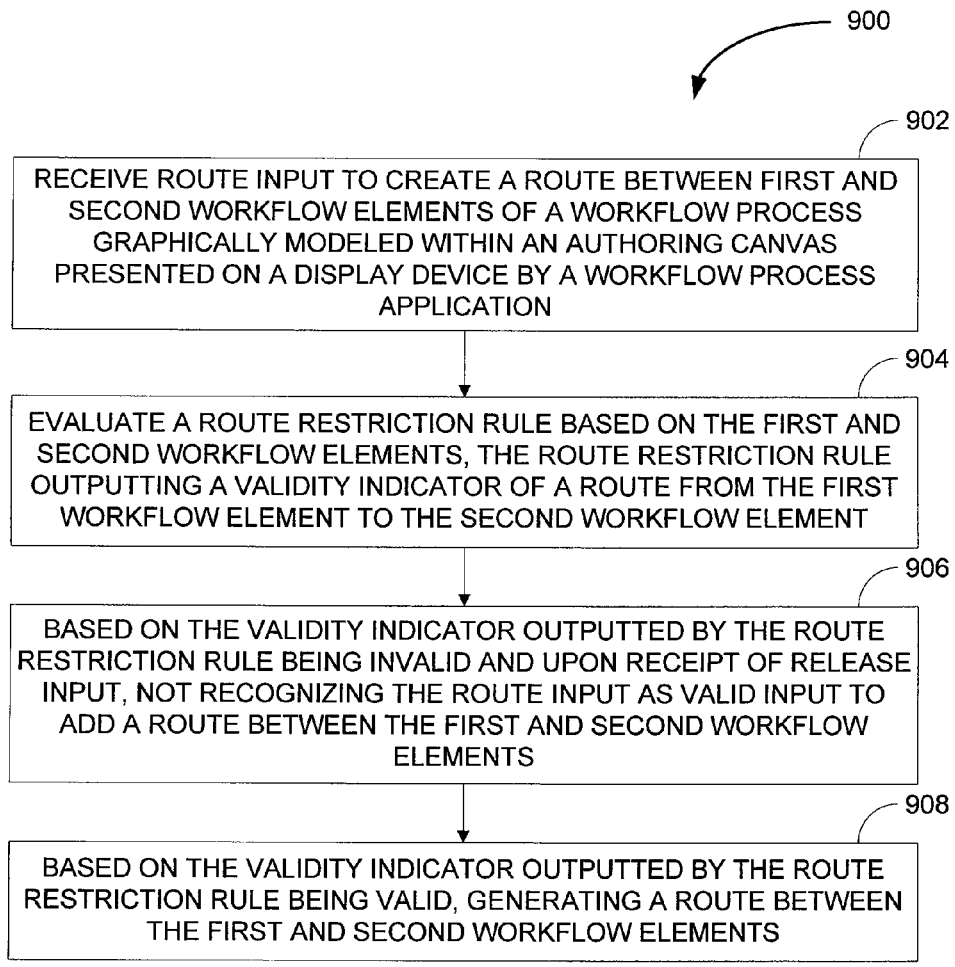
FIG. 9 is a block flow diagram of a method according to an example embodiment.

FIG. 9 is a block flow diagram of a method 900 according to an example embodiment. The method 900 is an example of another method that may be performed by a workflow process authoring application to define a route between two elements of a modeled workflow process. The method 900 includes receiving 902 route input to create a route between first and second workflow elements of a workflow process graphically modeled within an authoring canvas presented on a display device by a workflow process application. The method further includes evaluating 904 a route restriction rule based on the first and second workflow elements. The evaluating 904 of the route restriction rule outputs a validity indicator of a route from the first workflow element to the second workflow element. Based on the validity indicator outputted by the route restriction rule being invalid, not recognizing 906 the route input as valid input to add a route between the first and second workflow elements. When the validity indicator outputted by the route restriction rule is valid, the method 900 includes generating 908 a route between the first and second workflow elements.

An additional embodiment, in the form of a system, includes at least one processor, at least one memory device, a video output device such as a graphics card, and at least one input device interconnected via at least one integrated circuit board, such as a motherboard. The system of this embodiment includes a workflow modeling application stored in the at least one memory device and executable by the at least one processor. The workflow modeling application is executable by the at least one processor to present a view of a workflow modeling canvas via signals output by the video output device. The workflow modeling canvas, in some embodiments, is capable of rendering views of modeled workflow processes including interconnected workflow elements.

The workflow modeling application is further executable by the at least one processor to receive, via the at least one input device, route input to create a route between first and second workflow elements and movement input from the first workflow element to a second workflow element. Upon movement of an icon under control of the at least one input device over the second workflow element, the workflow modeling application is executable by the at least one processor to evaluate a restriction rule, or multiple route restriction rules, based on the first workflow element and the second workflow element. The route restriction rule in such embodiments outputs a validity indicator of a route from the first workflow element to the second workflow element. When the validity indicator output by at least one route restriction rule is invalid, the workflow modeling application does not recognize release input received to add the route between the first and second workflow elements. In some embodiments, when the validity indictor output by the route restriction rule is invalid, the workflow modeling application is further executable by the at least one processor to modify at least one of a portion of the authoring canvas to indicate the route between the first and second workflow elements cannot be made. However, when the validity indicator following evaluation of the route restrictions rule is valid and upon receipt of release input, the workflow authoring application is executable by the at least one processor to generate a route between the first and second workflow elements.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

receiving route input to create a route between first and second workflow elements of a workflow process graphically modeled within an authoring canvas presented on a display device by a workflow process application, the route input received via an input device into a computer performing the method;

receiving movement input from the first workflow element to a second workflow element presented within the authoring canvas;

upon movement of an input device icon over the second workflow element, evaluating a route restriction rule based on the first workflow element and the second workflow element, the route restriction rule outputting a validity indicator of a route from the first workflow element to the second workflow element;

when the validity indicator output by the route restriction rule is invalid, modifying the authoring canvas to indicate that a route between the first and second workflow elements cannot be made;

based on the validity indicator output by the route restriction rule being invalid and upon receipt of release input, not recognizing the release input as valid input to add a route between the first and second workflow elements; and based on the validity indicator output by the route restriction rule being valid and upon receipt of release input, generating a route between the first and second workflow elements.

2. The method of claim 1, wherein the route restriction rule outputs an invalid route indicator when the first workflow element is within a branch of a modeled workflow process and the second workflow element is not within that branch.

3. The method of claim 1, wherein the modifying of the authoring canvas to indicate that a route between the first and second workflow elements cannot be made includes modifying an appearance of the gesturing input device icon while the input device icon hovers over the second workflow element.

4. The method of claim 1, wherein the modifying of the authoring canvas to indicate that a route between the first and second workflow elements cannot be made includes modifying an appearance of the second workflow element.

5. The method of claim 1, wherein the generating of the route between the first and second workflow elements includes:
adding data representative of the generated route to a data structure of the workflow process graphically modeled within the authoring canvas; and
storing the data structure in a memory device of the computer.

6. The method of claim 1, wherein:
the route input is a button press of the input device;
the movement input is a movement of the input device while the button remains pressed; and
the release input is a release of the input device button.

7. A computer-readable storage medium, with instructions stored thereon, which when executed by a processor of a computer, cause the computer to execute a method comprising:
receiving route input to create a route between first and second workflow elements of a workflow process graphically modeled within an authoring canvas presented on a display device by a workflow process application;
evaluating a route restriction rule based on the first and second workflow elements, the route restriction rule outputting a validity indicator of a route from the first workflow element to the second workflow element;
when the validity indictor output by the route restriction rule is invalid, modifying the authoring canvas to indicate that a route between the first and second workflow elements cannot be made;
based on the validity indicator output by the route restriction rule being invalid, not recognizing the route input as valid input to add a route between the first and second workflow elements; and
based on the validity indicator output by the route restriction rule being valid, generating a route between the first and second workflow elements.

8. The computer-readable storage medium of claim 7, wherein the route restriction rule outputs an invalid route indicator when the first workflow element is within a branch of a modeled workflow process and the second workflow element is not within that branch.

9. The computer-readable storage medium of claim 7, wherein the modifying of the authoring canvas to indicate that a route between the first and second workflow elements cannot be made includes modifying an appearance of the second workflow element.

10. The computer-readable storage medium of claim 7, wherein the generating of the route between the first and second workflow elements includes:
adding data representative of the generated route to a data structure of the workflow process graphically modeled within the authoring canvas; and
storing the data structure in a memory device of the computer.

11. The computer-readable storage medium of claim 7, wherein receiving the route input includes receiving:
a button press of an input device while a pointer icon under control of the input device hovers over the first workflow element;
a movement of the input device while the button remains pressed; and
a release of the input device button while the pointer icon hovers over the second workflow element.

12. The computer-readable storage medium of claim 7, wherein receiving the route input includes:
presenting a user interface element from which the first and second workflow elements are selectable; and
receiving a selection of the first and second workflow elements.

13. A system comprising:
at least one processor, at least one memory device, a video output device, and at least one input device interconnected via at least one integrated circuit board; and
a workflow modeling application stored in the at least one memory device and executable by the at least one processor to:
present a workflow modeling canvas via signals output by the video output device, the workflow modeling canvas capable of rendering views of modeled workflow processes including interconnected workflow elements;
receive, via the at least one input device, route input to create a route between first and second workflow elements;
receive, via the at least one input device, movement input from the first workflow element to a second workflow element;
upon movement of an icon over the second workflow element, evaluate a route restriction rule based on the first workflow element and the second workflow element, the restriction rule outputting a validity indicator of a route from the first workflow element to the second workflow element;
when the validity indictor output by the route restriction rule is invalid, modifying the authoring canvas to indicate a route between the first and second workflow elements cannot be made;
based on the validity indicator output by the route restriction rule being invalid, not recognizing the release input as valid input to add a route between the first and second workflow elements.

14. The system of claim 13, wherein the restriction rule outputs an invalid route indicator when the first workflow element is within a branch of a modeled workflow process and the second workflow element is not within that branch.

15. The system of claim 13, wherein modifying the authoring canvas to indicate a route between the first and second workflow elements cannot be made includes modifying an appearance of the icon under control of the at least one input device while the icon under control of the at least one input device hovers over the second workflow element.

16. The system of claim 13, wherein modifying the authoring canvas to indicate a route between the first and second workflow elements cannot be made includes modifying an appearance of the second workflow element.

17. The system of claim 13, wherein the workflow modeling application is further executable by the at least one processor to:
based on the validity indicator following evaluation of the route restriction rule being valid and upon receipt of release input, generate a route between the first and second workflow elements.

* * * * *